(12) United States Patent
Valery et al.

(10) Patent No.: US 8,752,417 B2
(45) Date of Patent: Jun. 17, 2014

(54) GRADIENT-ELUTION MULTI-COLUMN SEPARATION METHOD

(75) Inventors: Eric Valery, Pulnoy (FR); Hector Osuna Sanchez, Laxou (FR); Michel Bailly, Nancy (FR)

(73) Assignee: Novasep, Pompey (FR)

( * ) Notice: Subject to any disclaimer, the term of this patent is extended or adjusted under 35 U.S.C. 154(b) by 566 days.

(21) Appl. No.: 12/936,319

(22) PCT Filed: Apr. 3, 2009

(86) PCT No.: PCT/IB2009/005191
§ 371 (c)(1),
(2), (4) Date: Oct. 4, 2010

(87) PCT Pub. No.: WO2009/122281
PCT Pub. Date: Oct. 8, 2009

(65) Prior Publication Data
US 2011/0030457 A1 Feb. 10, 2011

(30) Foreign Application Priority Data

Apr. 3, 2008 (FR) ...................................... 08 01844

(51) Int. Cl.
*G01N 30/02* (2006.01)
(52) U.S. Cl.
USPC ........................................................ 73/61.53

(58) Field of Classification Search
USPC ........................................................ 73/61.53
See application file for complete search history.

(56) References Cited

U.S. PATENT DOCUMENTS

| 5,630,943 A * | 5/1997 | Grill ............................. 210/659 |
| 7,749,390 B2 * | 7/2010 | Toumi .......................... 210/659 |
| 2011/0168632 A1 * | 7/2011 | Valery et al. .................. 210/659 |

FOREIGN PATENT DOCUMENTS

| EP | 0495640 A1 | 7/1992 |
| JP | 02-238358 A | 9/1990 |
| WO | 2006/116886 A1 | 11/2006 |
| WO | 2007/012750 A2 | 2/2007 |
| WO | WO 2007012750 A2 * | 2/2007 |

* cited by examiner

*Primary Examiner* — Peter Macchiarolo
*Assistant Examiner* — Tamiko Bellamy
(74) *Attorney, Agent, or Firm* — Marsh Fischmann & Breyfogle LLP; Jonathon A. Szummy (57) ABSTRACT

The invention relates to a method for separating fractions of a mixture to be separated including the steps of providing a device comprising at least two chromatography columns mounted in series, discontinuously injecting a mixture to be separated, in a single point of the device, discontinuously drawing off the fraction enriched in the product of interest, in a single point of the device, and injecting eluents in each column and displacing the points for injection eluents, the eluents having a different eluting power. The method allows efficient separation which is simple to perform.

16 Claims, 10 Drawing Sheets

GRADIENT-ELUTION MULTI-COLUMN SEPARATION METHOD

FIELD OF THE INVENTION

The present invention relates to a gradient-elution multi-column separation method for fractions of a mixture, by chromatography.

BACKGROUND OF THE INVENTION

Chromatography is a separation method based on the distribution difference of compounds of a mixture between a mobile phase and a stationary phase, also called an adsorbent phase. The compounds are separated by percolating a liquid, gas or supercritical solvent in a device (a column) filled with an adsorbent phase. This method is widely applied as an analysis technique in order to identify and quantify the compounds of a mixture. It may also be applied as a purification technique.

Depending on the needs, different chromatography methods are used for achieving purification of molecules. These methods may be classified according to several criteria: the method may be discontinuous or continuous; the systems may include one or more columns; the composition of the eluent may be isocratic or a gradient may be effected.

Elution chromatography or batch chromatography is widely used. This method is based on discontinuous injection of the mixture to be purified in a column filled with the suitable stationary phase which is percolated with an eluent ensuring migration and separation of the products in the column. The separated products are drawn off at the column outlet. The injections may be repeated periodically with a period time allowing the separation to be retained between successive injections.

So-called batch chromatography is a widespread method, notably at a small and medium scale. It is a simple method to apply (a single column) which proves to be generally efficient, but not very performing in terms of productivity. The latter is generally low and the purified products are generally highly diluted in the elution solvent.

The idea of producing a counter-current between the eluting phase and the adsorbing phase was explored in order to give rise to the concept of a True Moving Bed. In 1961, a method appeared, the "Simulating Moving Bed", (SMB), with which the movement of the solid may be simulated by a clever connection between the columns. It is characterized in that the points for introducing the feed and eluent are advanced periodically in the direction of flow of the main fluid, while the points for drawing off a raffinate and an extract are advanced simultaneously and according to a same increment.

Document EP-A-1 716 900 describes the integration of a method with a driving-force gradient into an SMB method. The document describes a method for continuous or quasi-continuous purification of a mixture containing several compounds. As in SMB, several areas are applied. The purification is accomplished by means of at lest two, preferably three individual chromatography columns into which the mixture is introduced, by means of a solvent. The mixture containing several compounds comprises at least lightweight impurities, an intermediate product to be purified and heavy impurities. The columns are used according to at least one step or one position in a batch mode. In this mode, the outlet of a column is used for drawing off the intermediate product. Columns are also used in at least one step or one position in a continuous or quasi-continuous mode. In this mode, the outlet of at least one column is in fluid connection connected to the inlet of at least one other column. The batch mode and the continuous or quasi-continuous modes are carried out synchronously or sequentially. After or in a switching period, the columns are moved in a direction opposite to the general direction of the solvent flow.

A drawback of this method is that it requires a complex device for applying it and simulation tools for understanding it.

SUMMARY OF THE INVENTION

The object of the invention is to obtain a performing method while being simple to carry out.

For this, a method for separating fractions of a mixture to be separated is proposed, comprising the steps of
 providing a device comprising at least two chromatography columns mounted in series,
 discontinuously injecting a mixture to be separated, in a single point of the device,
 discontinuously drawing off the fraction enriched in the product of interest, in a single point of the device,
 injecting eluents in each column and displacing the points for injecting eluents, the eluents having different eluting power.

According to an alternative, the method for separating fractions of a mixture to be separated, comprises the steps of
 providing a device comprising three chromatography columns mounted in series,
 discontinuously injecting a mixture to be separated in a single point of the device,
 discontinuously drawing off the fraction enriched in the product of interest, in a single point of the device,
 injecting eluents in each column and displacing the points for injecting eluents, the eluents having different eluting power.

According to an alternative, the injection of the mixture to be separated is cyclic.

According to an alternative, the drawing-off of the enriched fraction is cyclic.

According to an alternative, the displacement of the points for injecting eluents is periodic.

According to an alternative, the eluents are injected continuously or discontinuously.

According to an alternative, at least one eluent is injected discontinuously.

According to an alternative, the composition of each eluent is constant.

According to an alternative, the composition of at least one eluent independently of each other is variable.

According to an alternative, at least one eluent is displaced asynchronously.

According to an alternative, at least two columns separate the point for injecting the feed to be treated from the point for drawing off the product of interest, according to the direction of flow of the mobile phase.

According to an alternative, all the columns of the system separate the point for injecting the feed to be treated from the point for drawing off the product of interest, according to the direction of flow of the mobile phase.

According to an alternative, the mixture to be separated in injected by means of units selected from the group comprising an injection loop, an injection pump, a pressurized container.

According to an alternative, the mixture to be separated is circulated in an additional chromatography column prior to injection into the device.

According to an alternative, the additional chromatography column is inserted between the mixture injection unit and the single point for injecting the mixture into the device or is between two columns of the device.

According to an alternative, the drawn-off volume of fraction enriched in the product of interest is variable.

According to an alternative, the mixture to be separated is injected by means of units selected in the group comprising an injection loop, an injection pump.

According to an alternative, the mixture to be separated is circulated in an additional chromatography column prior to injection into the device.

According to an alternative, the additional chromatography column is inserted between the mixture injection unit and the single point for injecting the mixture into the device or is between two columns of the device.

According to an alternative, the composition of each eluent independently of each other is constant or variable.

According to an alternative, the eluents are injected continuously or discontinuously.

According to an alternative, the eluents are displaced independently of each other.

According to an alternative, the method is cyclic.

According to an alternative, the device constantly has at least one inlet and at least one outlet.

According to an alternative, the drawing-off of the product of interest is performed at the outlet of the column preceding the one where the feed is introduced.

According to an alternative, the fraction depleted in the product of interest is reinjected into the device.

A use of the method described earlier is also proposed for separating synthetic molecules, natural extracts, proteins obtained by fermentation, proteins obtained by synthesis or hemi-synthesis, immunoglobulins, monoclonal antibodies, peptides obtained by fermentation, peptides obtained by synthesis or hemi-synthesis.

DESCRIPTION OF THE DRAWINGS

Other features and advantages of the invention will become apparent upon reading the detailed description which follows, of the embodiments of the invention, given only as an example and with reference to the drawings which show.

DETAILED DESCRIPTION

A method for separating fractions from a mixture to be separated is proposed. This method is applied to a device comprising at least two chromatography columns mounted in series. The method comprises steps for discontinuously injecting a mixture to be separated, in a single point of the device, for discontinuously drawing off the fraction enriched in the product of interest in a single point of the device, for injecting eluents in each column and for displacing the eluent injection points. These eluents have different eluting power. The method allows efficient separation which is simple to perform.

This method is a multicolumn separation method with a gradient. This method is a non-batch method. It will in particular be applied to separations of a mixture containing at least two compounds. The separation proposed by the method uses a gradient of eluting power applied during chromatography.

The molecules which may thereby be purified are for example: synthetic molecules, natural extracts, proteins obtained by fermentation, proteins obtained by synthesis or hemi-synthesis, immunoglobulins, monoclonal antibodies, peptides obtained by fermentation, peptides obtained by synthesis or hemi-synthesis.

The stationary phases which may be used are for example: porous solid supports (for example silicas, also called normal phases), grafted porous solid supports (for example so-called reverse phases), ion exchange resins, grafted resins (for example with a protein). In a more general way, all the stationary phases for which it is relevant to apply a composition gradient of the mobile phase, for example in size exclusion chromatography combined with the application of a gradient of surfactants.

The composition gradient of the mobile phase may be achieved in different ways: passing from one composition to another in a direct way, one then refers to a 'step' gradient, or by a gradual passing from one composition to the other.

The mobile phases which may be used are fluids for example:
  liquids: water and/or organic solvents, with or without the use of salts or buffer solutions.
  supercritical gases and/or fluids either in the presence or not of organic solvents.

The pressure ranges are variable with the grain size of the stationary phase, the viscosity of the solvent and the velocity of the mobile phase inside the columns, and generally are comprised between 0.1 and 300 bars. For example, they will be:
  0.1 to 10 bars on grain sizes ranging from 400 µm to 50 µm
  3 to 50 bars on grain sizes ranging from 90 µm to 5 µm
  40 to 300 bars by using eluents containing $CO_2$ dissolved in the liquid phase or in the liquid or supercritical state.

Figure 1:
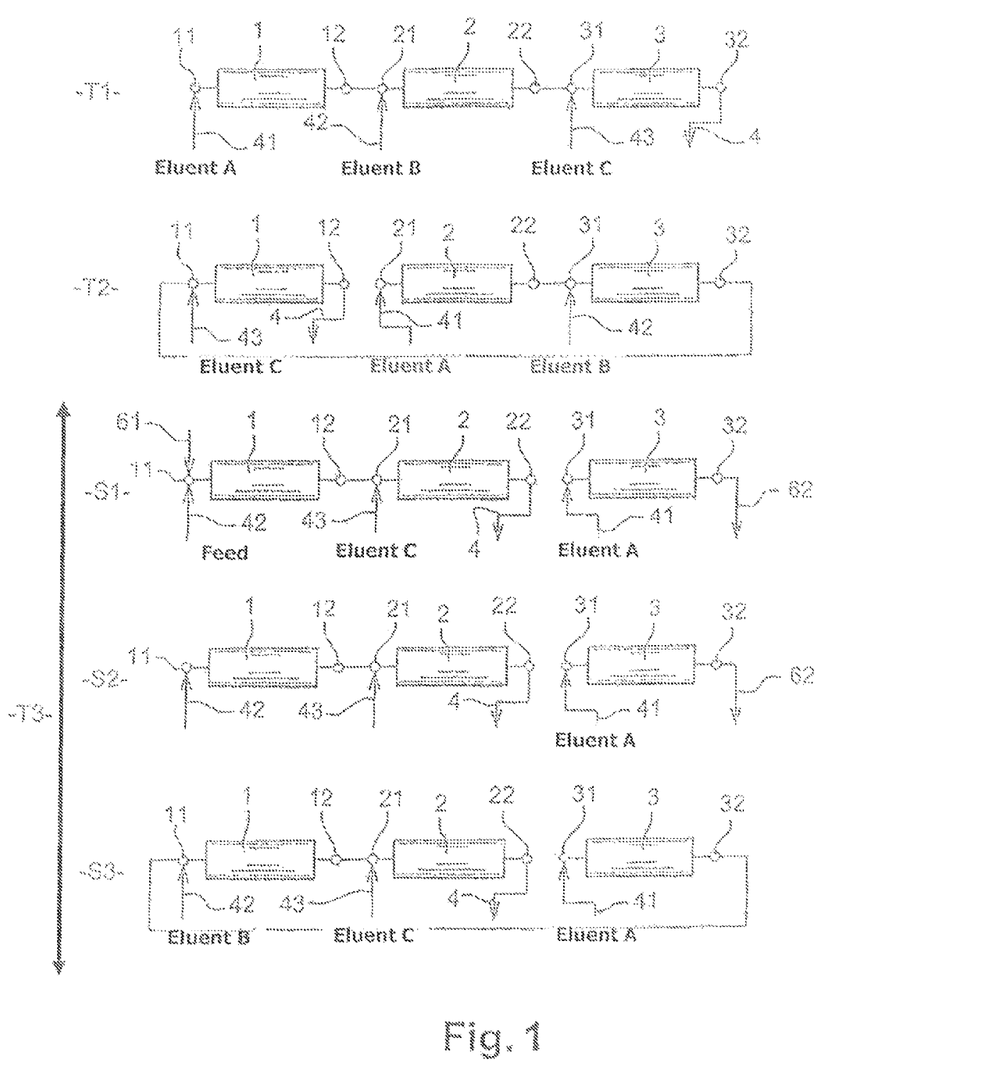
FIGS. 1 and 2, the operation of the separation method.

FIG. 1 shows the operation of the separation method. This separation method is applied to a device including chromatography columns. With this method it is possible to separate fractions of a mixture (or feed) to be separated. The mixture may be binary or ternary, i.e. including two or three compounds. In the case when the mixture is ternary, i.e. with three compounds, the product of interest is in the core fraction (i.e. the product of interest is surrounded with impurities which have smaller and higher retention times). However, the mixture may contain more than three compounds. According to FIG. 1, the device comprises three columns 1, 2 and 3 mounted in series, i.e. column 1 has an outlet 12 contiguous with the inlet 21 of column 2; this outlet 12 may be connected to the inlet 21 of column 2 so as have a fluid circulate between both columns 1 and 2. Also, the outlet 22 of column 2 is contiguous to the inlet 31 of column 3. In the following, columns for which the outlet of a first column may be connected to the inlet of a second column in order to have a fluid circulate between both columns are called columns in series.

The method operates in an open loop, i.e. at any moment of the method, the device includes at least one inlet and at least one outlet.

Eluents A, B and C with different eluting powers are injected through the points 41, 42 and 43 in columns 1, 2 and 3 respectively, at the points 11, 21 and 31. An outlet 4 is connected to the outlet 32 of column 3. After a period T1, the injection points 41, 42, 43 of the eluents A, B and C are displaced. The period is the time interval which separates two displacements of a same eluent. According to FIG. 1, the injection points 41, 42, 43 are displaced so that the eluents A, B and C are injected into columns 2, 3 and 1 respectively, at the points 21, 31 and 11. The outlet 4 which was found at the outlet 32 of column 3 undergoes the same displacement and is then connected to the outlet 12 of column 1. After another period T2, the injection points 41, 42 and 43 are displaced so that the eluents A, B and C are injected into columns 3, 1 and 2 respectively at the points 31, 11 and 21, and the outlet 4 is connected to the outlet 22 of column 2.

It may be noticed that a new displacement at the end of the period T3 leads to the device being again in its initial state, i.e. the state of period T1. The described separation method operates cyclically, the device being in an initial configuration at the end of each cycle.

With this displacement of the injection points 41, 42 and 43, after a period T, a composition gradient of the mobile phase may be achieved in columns 1, 2 and 3. Indeed, during period T1, i.e. when the eluents A, B and C are injected in columns 1, 2 and 3 respectively, column 1 is crossed by the eluent A alone; column 2 is crossed by a mixture of the eluents A and B; column 3 is crossed by a mixture of the eluents A, B and C. The end of the period T1 and the beginning of the period T2 are marked by the displacement of the eluents A, B and C so that the eluents are injected into columns 2, 3 and 1 respectively. Column 1 is then crossed by a mixture of eluents A, B and C; column 2 is crossed by eluent A alone; column 3 is crossed by a mixture of eluents A and B. In the same way, the end of the period T2 and the beginning of the period T3 are marked by the displacement of the injection points of the eluents. Column 1 is then crossed by the mixture of eluents A, B; column 2 is crossed by the mixture of eluents A, B, C; column 3 is crossed by the eluent A. At the end of the period T3, the injection points of the eluents are displaced. According to FIG. 1, the injection points of the eluents return to the position of the period T1.

Thus, the composition of the mobile phase within a same column varies during a cycle, i.e. during the time after which an eluent injection point returns to its initial position. For example, column 3 will be crossed during a cycle successively by a mixture of eluents A, B and C, and then by a mixture of eluents A and B, and finally by eluent A alone. The same situation is again found for each column, successively. By this simple displacement of the eluents, a composition gradient of the mobile phase is generated within each column. This is advantageous, whether this is in terms of production (shorter cycles) or of separation (better resolution between the different products and reproducibility).

The output 4 shown in FIG. 1 may be totally or partly reinjected at one of the eluent injection points 41, 42, or 43.

According to FIG. 1, the displacement of each eluent occurs simultaneously, for example. In this case, there are as many periods as columns. According to another example, each eluent may be displaced independently of the other ones (asynchronous displacements), or not be displaced. These independent asynchronous displacements occur periodically.

Each of the eluents A, B and C may have an identical composition during one or more periods, or during a cycle, or else have a variable composition and this independently of the other eluents. This is advantageous in that it is possible to adapt the compositions of the eluents depending on the desired separation (separation rate, purity of the product of interest . . . ) and also depending on the characteristics of the product of interest (sensitivity of the retention times to the composition of the mobile phase). During the cycle, it is possible that two eluents of different composition be simultaneously injected into a same column in order to attain a particular composition at the inlet. This is advantageous in that it is possible to ensure multiple compositions at the inlet of a column from a few available initial compositions (reservoirs with fixed composition).

Further, the injection of the eluents A, B and C may be performed discontinuously or continuously, i.e. the injection of the eluents is either interrupted or not over time. Discontinuous injection has the advantage of great flexibility by allowing the use of the eluent over just a sufficient duration. The injection of an eluent may be stopped at the moment of the displacement of its injection point. Continuous injection, as for it, has the advantage of simplicity of application.

The mixture to be separated is injected in a single point of the device. According to FIG. 1, it is injected into the inlet 11 of the column 1, at the injection point 61 of the mixture. This injection point is unique. This is particularly advantageous in that it allows the use of all standard injection devices, as well as more complex devices. Further, this avoids that each column has an injection device. Thus, this device requires less conduits and valves, and is easier to clean. Further, this device is more simple to control than a device having several points for injecting the mixture to be separated.

In fact, it is possible to use all the standard injection modes. For example, an injection loop may be used. This injection mode allows insertion into the flow of a known volume of the mixture to be separated. It is also possible to use a pump. This injection mode allows injection of the mixture of the feed to be directly treated, or as an addition to an existing flow.

The injection of the mixture to be separated is discontinuous (or in other words non-continuous), i.e. the injection of the mixture is interrupted over time. This injection has the advantage of great flexibility and ease of application.

The injection of the mixture to be separated is cyclic, during one of the periods or between two periods. According to the example of FIG. 1, the injection of the mixture occurs during period T3. The period T3 may thus include a sequence S1 during which the injection of the mixture to be separated may occur. If the mixture is injected during a period of time shorter than the duration of the period T3, the sequence S1 may have a duration shorter than the period T3. The moment at which the mixture is injected and the column where the mixture is injected are variable, the injection sequence may, depending on the cases, occur during either one of the periods of the cycle, or even the injection sequence may begin during a period and end during the next period.

Drawing-off of the fraction enriched in the product of interest is performed in a single point of the device. According to FIG. 1, drawing-off is performed at the outlet 32 of the column 3. This is advantageous, in that it only requires the installation of a single drawing-off device for the whole device instead of one device per column. Thus, this device requires less conduits and valves and is easier to clean. Further, this device is more simple to control.

The drawing-off of the fraction enriched in the product of interest is performed discontinuously, i.e. the drawing-off is interrupted over time. This drawing-off has the advantage of having great flexibility with regard to the adjustment of the drawn-off volume. This allows adjustment of the concentration of the fraction, in order to remain within the physical limits of the system (solubility in the mobile phase, saturation of the stationary phase). The smaller the drawn-off volume, the stronger will be the concentration. Further, application of this drawing-off is simpler than continuous drawing-off.

The drawing-off of the fraction enriched in the product of interest is cyclic: it is performed during one of the periods or may begin during one period and end during the next. The drawing-off may be total or partial (sampling a portion of the flow passing from one column to the next). According to the example of FIG. 1, the drawing-off of the fraction enriched in the product of interest occurs during the period T3 at the drawing-off point 62. The period T3 may thus include a sequence S1 during which the drawing-off of the fraction enriched in the product of interest may occur. If the fraction enriched in the product of interest is drawn off during a period of time shorter than the duration of the period T3, the sequence S1 may have a duration shorter than the period T3. FIG. 1 shows, as an example, that the drawing-off at the drawing-off point 62 and the injection of the mixture at the injection point 61 may occur during a same sequence S1; however, the injection and the drawing-off may occur at different sequences. Further, according to the example of FIG. 1, the drawing-off of the fraction enriched in the product of interest may extend beyond the sequence S1, up to a sequence S2 during which the mixture is no longer injected. Also, FIG. 1 shows, as an example, that the period T3 is longer than the sequences S1 and S2. The period T3 may thus include a sequence S3 during which neither drawing-off of the fraction enriched in the product of interest nor injection of the mixture occur.

Preferentially, if the mixture to be separated is injected at the inlet of the first column, the drawing-off of the product of interest is performed at the outlet of the last column. This is particularly advantageous in that the product of interest is drawn off after having crossed all the columns of the system.

According to FIG. 1, the injection of the mixture to be separated and the drawing-off of the product of interest may be performed at the same time. In the particular case of FIG. 1, the drawing-off of the product of interest during a cycle simultaneously begins with a new injection of the mixture to be separated. This particular case is however non-limiting for the invention.

During the performance of the step for injecting the feed to be treated, it is possible to stop the injection of one or more eluents. Also, during the drawing-off of the product of interest, it is possible to stop the injection of one or more eluents. The periods during which injection and drawing-off of the product of interest occur, may have different durations.

Figure 2:
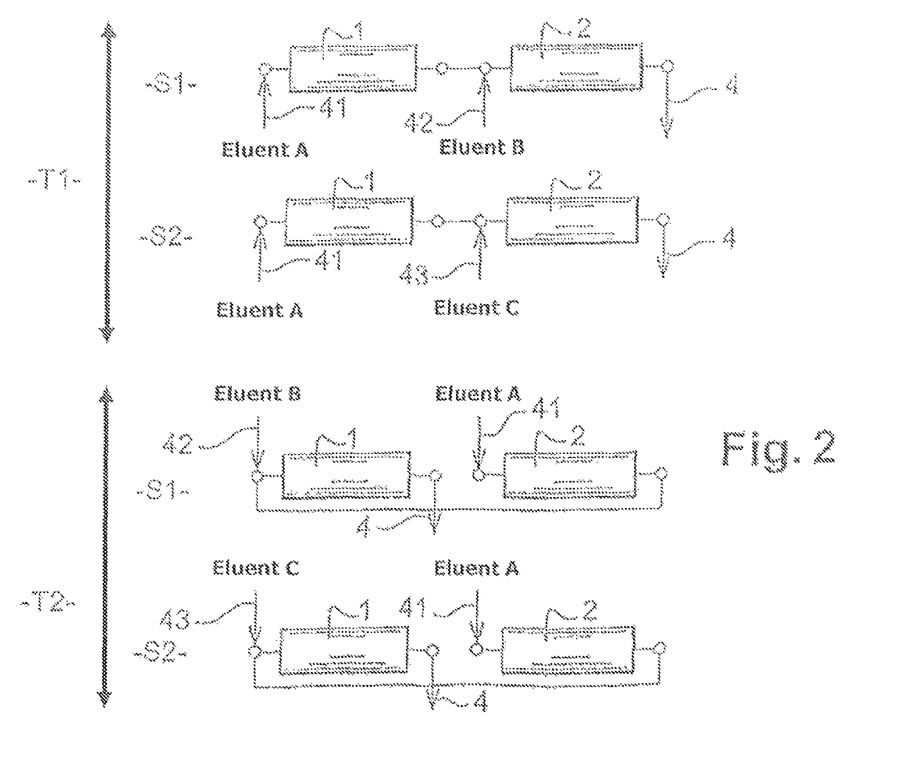

FIG. 2 shows an operating example of the separation method using two columns. This method is applied to a device comprising two columns in series. According to FIG. 2, during the first period T1 of the cycle, two eluents of different eluting power are injected into columns 1 and 2.

The period T1 may be divided into two sequences. The first sequence S1 includes the injection of two eluents A and B in columns 1 and 2 respectively, at the injection points 41 and 42. The second sequence S2 includes the injection of two eluents A and C in columns 1 and 2 respectively, at the injection points 41 and 43.

After a period T1, the method passes to the period T2. The period T2 also includes two sequences S1 and S2. The points for injecting the eluents are displaced so that both eluents A and B are injected into columns 2 and 1 respectively during sequence S1 (injection points 41 and 42) and the eluents A and C are injected into columns 2 and 1 respectively during the sequence S2 (injection points 41 and 43). The outlet of column 2 is connected to the inlet of column 1 during this second period T2. The cycle consists of two periods. Sequences (not shown) for injecting the mixture to be separated and for drawing-off the product of interest occur only once during the cycle. For example the mixture may be injected at the inlet of column 2 during the sequence S1 of the period T2 and the product of interest may be drawn off at the outlet of column 1 during the sequences S1 and S2 of the period T2. This example is non-limiting on the events and the number of sequences of the periods.

Figure 3:
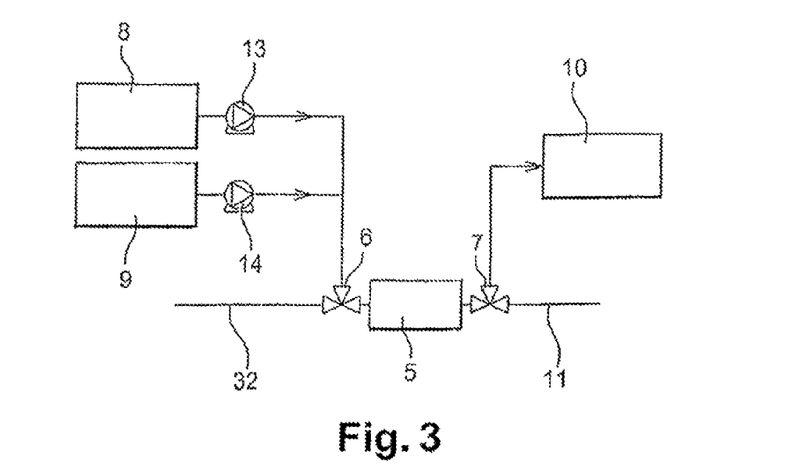
FIGS. 3 and 4, mixture injection devices.
Figure 4:
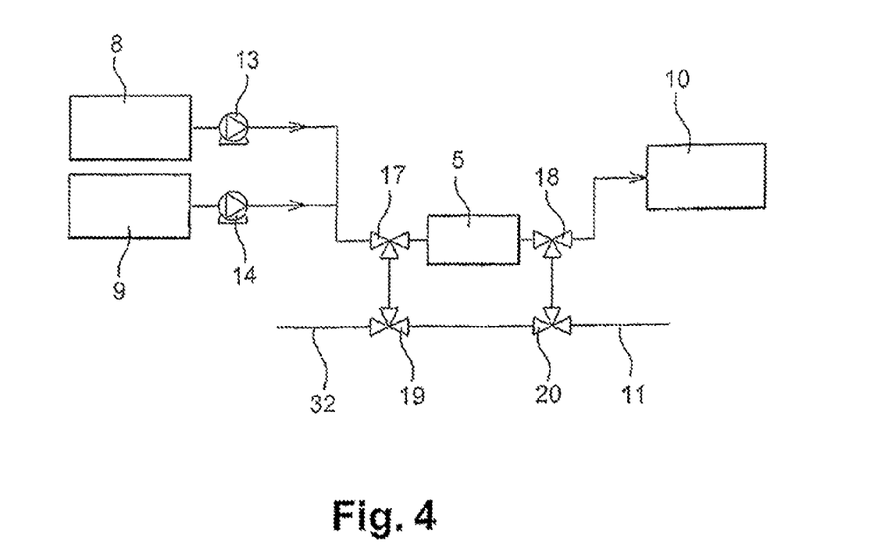

FIGS. 3 and 4 show mixture injection devices. These devices use pumps 13 and 14 and an additional column 5. The additional column 5 is also called a pre-column. The mixture is circulated in the additional column 5 before reaching the device. Such an additional column 5 has the purpose of retaining certain impurities of the mixture to be separated, in particular the impurities very strongly retained on the column. Thus, this allows a limitation of the contamination of the device by certain impurities, and thus facilitates its cleaning.

FIG. 3 shows a device for injecting a mixture in which the additional column 5 is inserted between the outlet of a first column and the inlet of a second column, both of these columns being mounted in series. For example, in FIG. 1, the additional column 5 may be inserted between the outlet 32 of column 3 and the inlet 11 of column 1. Two three-way valves 6 and 7 are placed at the inlet and at the outlet of the additional column 5, and provide the connection between the columns in series and the additional column 5. The valve at the inlet 6 also allows injection of the mixture to be separated 8 or else of a regeneration solvent 9, in order to clean the additional column 5. The valve placed at the outlet 7 also allows disconnection of the outlet of the additional column 5 from the inlet of the next column in order to discharge through the line 10 the regeneration solvent 9 and the impurities to be discharged. This is particularly advantageous in that only the additional column 5 has to be regenerated and not the whole of the device. Another advantage is that the additional column may be cleaned without contaminating the device. A cleaning, regeneration sequence may occur during the cycle.

FIG. 4 shows a device for injecting a mixture, in which the additional column 5 or pre-column, is not directly inserted between the outlet of a first column and the inlet of a second column in series with the first, but in a set of conduits and three-way valves (17, 18, 19, 20) allowing different combinations: the mixture to be separated 8 may be directly inserted at the inlet of a column, or else after circulation through the additional column 5. The additional column 5 may be disconnected from the inlet of a column and be regenerated without contaminating the device, without stopping the method by a step for regenerating the additional column 5. For example, in FIG. 1, the additional column 5 may be connected to the outlet 32 of column 3 through the valve 19 and to the inlet 11 of column 1 through the valve 20. Also, it is seen that the additional column 5 may be short-circuited when the valves 19 and 20 are directly connected together.

The devices of FIGS. 3 and 4, as an example, show two methods for using an additional column 5 for carrying out injection of the feed; devices using a different number of valves with two or several ways, of pumps and of solvents, may naturally be contemplated. Also, the direction of flow of the fluids in the additional column may be reversed relatively to FIGS. 3 and 4.

The feed to be treated may also be injected in the system by using not a pump but a pressurized container.

The other fractions of the feed to the treated are drawn off via periodic displacement of a drawing-off line, or in a single point of the system. Optionally, the drawing-off of the fractions is carried out on the total flow or by partial drawing-off.

A regeneration sequence may also be added per period in order to regenerate the columns of the system.

The method according to the invention is also applicable in the cases of non-liquid elution, such as fluids containing $CO_2$, as described in application WO-A-2008025887, such as supercritical or subcritical fluids. The addition of a co-solvent may then be carried out.

According to an alternative of the invention, the columns may be of uniform or non-uniform volumes.

According to an alternative of the invention, the durations of the periods may be uniform or non-uniform.

According to an alternative of the invention, sequences for cleaning, for desorbing strongly retained products, for regenerating or equilibrating columns may be added, and they may have identical or different durations depending on the periods. According to an alternative, these steps may be carried out by reversing the direction of elution.

According to an alternative of the invention, one or more sequences for drawing-off the non-desired product may be performed from time to time within the system. With this drawing-off, it is possible to avoid the too strong concentration of certain impurities, the retention times of which are close to the retention times of the desired product.

In a non-limiting way, the following examples provide a better illustration of the invention.

Example 1

The following example, from a simulation, illustrates the application of the method as compared with a batch method. In this example, the simulation exactly replicates the sequences described in the examples by repeating several cycles.

The model used is of the diffusional piston type with resistance to internal transfer, described by a LDF (Linear Driving Force) law. The parameters are extracted from the coefficients of a Van Deemter law, determined at a concentration of modifier equal 1 to the one used for defining the parameters of the equilibrium law. The adsorption equilibrium law as well as the composition of the feed to be treated again take the model presented by Ströhlein et al. (J. Chrom. A 1126 (1-2), 338-346, 2006), by considering a column with a diameter of 1 cm and a length of 30 cm, eluted at 1.6 mL/min, for a modifier content of 180 g/L, the retention times of the three compounds of the feed to be treated are 127, 168 and 208.5 minutes respectively; for a modifier content of 200 g/l, the retention times are 38.5, 49.5 and 60.5 minutes respectively.

The example repeats the method according to FIG. 1.

The length and the diameter of the columns is 10 cm and 1 cm respectively.

Eluents A, B and C with different eluting power are injected through the points 41, 42 and 43 in columns 1, 2 and 3, respectively, at the points 11, 21 and 31. The outlet 4 is connected to the outlet 32 of column 3.

After a period T1, the injection points 41, 42, 43 of the eluents A, B and C are displaced. The injection points 41, 42, 43 are displaced so that the eluents A, B and C are injected into the columns 2, 3 and 1 respectively, at the points 21, 31 and 11. The outlet 4 is then connected to the outlet 12 of column 1.

After a period T2, the injection points 41, 42 and 43 are displaced so that the eluents A, B and C are injected into the columns 3, 1 and 2 respectively at the points 31, 11 and 21, and the outlet 4 is connected to the outlet 22 of column 2.

The periods T1, T2 and T3 last for 12.5 minutes. The cycle, with a duration of 37.5 minutes, begins at t=0. The period T1 extends from 0 to 12.5 min. The period T2 extends from 12.5 to 25 minutes. The period T3 extends from 25 to 37.5 min.

The period T3 may be divided into three sequences, as illustrated in FIG. 1. The first sequence S1 extends from 25 to 26.5 minutes. During this period, 3.45 mL of mixture to be separated is injected into the inlet 11 of column 1. Drawing-off occurs at the outlet 32 of column 3.

The second sequence S2 extends from 26.5 to 27.1 minutes. There is no longer any injection of the mixture to be separated. The drawing-off at the outlet 32 of column 3 is always effective.

The third sequence S3 extends from 27.1 to 37.5 minutes. There is no longer any injection of the mixture to be separated or any drawing-off.

In this particular case, it is found that the injection and the drawing-off begin at the same time at t=25 min, the injection ending sooner than the drawing-off: at t=26.5 min, which may occur but this is not a general case.

In this example, the modifier composition of eluent A varies linearly between 205 and 215 g/L between the beginning and the end of the period so as to vary the eluting power of the eluent A. On the other hand, the modifier content of eluents B and C remains constant and equal to 180.7 and 172.8 g/L respectively. The flow rates of eluents A, B and C are 1.6, 0.8 and 1.4 mL/min respectively.

Figure 5:
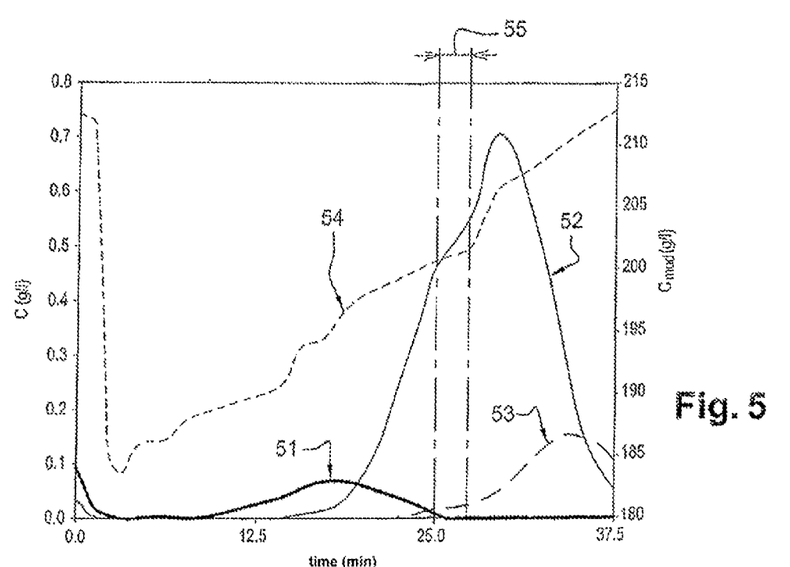
FIGS. 5 to 11, exemplary elution graphs of compounds.
Figure 6:
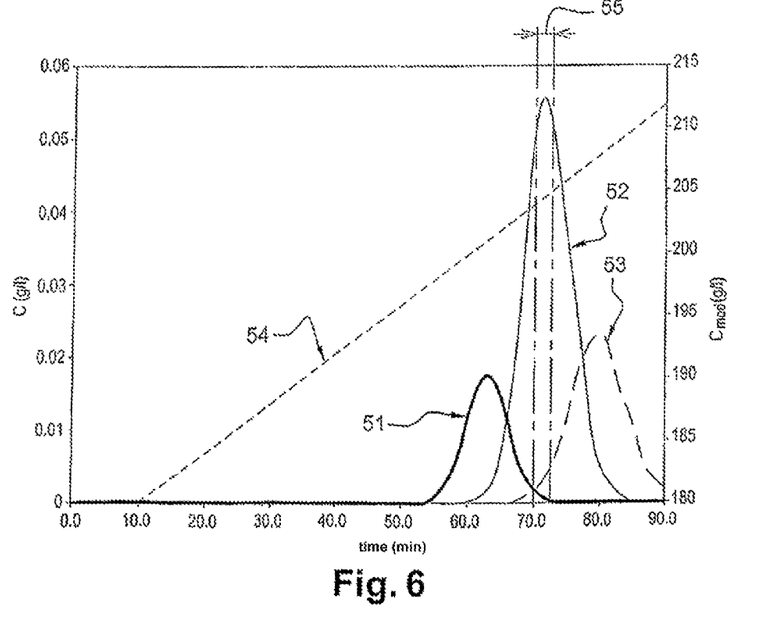

FIG. 5 shows the chromatogram obtained at the outlet of the column 3. In FIG. 5, the compound II is the compound of interest, the purification of which is desired. The curve 51 corresponds to the compound I concentration versus time. The curve 52 corresponds to the compound II concentration versus time. Curve 53 corresponds to the compound III concentration versus time. Curve 54 corresponds to the modifier concentration versus time. The interval 55 between the dashed lines delimits the time interval corresponding to drawing-off. The purity is 96% with a yield of 89%. FIG. 6 shows the chromatogram corresponding to an injection according to a batch method with an injection volume of 3.45 mL of a mixture of compounds I, II, III (respective concentrations 0.15, 0.55 and 0.25 g/L) which is eluted (flow rate Q=1.6 mL/min) with a gradient (modifier concentration $C_{mod}$=180-215 g/L). The length and the diameter of the column are 30 cm and 1 cm respectively. The compound II is the compound of interest, the purification of which is desired. The curve 51 corresponds to the concentration of compound I versus time. Curve 52 corresponds to the concentration of compound II versus time. Curve 53 corresponds to the concentration of compound III versus time. Curve 54 corresponds to the modifier concentration versus time. The dash-dot lines 55 show the drawn-off fraction with a purity of 94% and a yield of 20%. Thus for a same volume of feed treated per cycle, at the same amount of stationary phase used, the method according to the invention allows an improvement in purity and yield.

Example 2

This example repeats the conditions of Example 1 applied on two columns according to FIG. 2. The length and the diameter of the columns are 10 cm and 1 cm respectively.

During the first period, the outlet of column 1 is connected to the inlet of column 2, during the first period, during the sequence S1, the eluents A and B are injected into columns 1 and 2 respectively. During the first period, during sequence S2, the eluents A and C are injected into columns 1 and 2 respectively.

During the second period, the outlet of column 2 is connected to the inlet of column 1. During the second period, during the sequence S1, the eluents A and B are injected into columns 2 and 1 respectively. During the second period, during sequence S2, the eluents A and C are injected into columns 2 and 1 respectively.

The sequence S1 lasts for 7.5 minutes, the sequence S2 lasts for 17 minutes. The duration of a period is 24.5 minutes, the total duration of the cycle is 49 minutes.

During a period, the composition of the eluent A is equal to 190 g/l of modifier from 0 to 7.5 minutes and then varies linearly until it reached 200 g/L at the end of the period.

The composition of the eluents B and C is constant and equal to 215 g/L and 127 g/L.

The flow rates of the eluents A, B and C are 2, 1.33 and 0.25 mL/min respectively.

The injection of the mixture to be separated is carried out in column 1 between 38.5 and 39.5 min, with a flow rate of 2 mL/min.

Collecting the product of interest is performed at the outlet of the column 2 between 38.5 and 40.5 min. The obtained purity of the product of interest is 93% with a yield of 76%.

Example 3

The following example illustrates the application of the method for two complex mixtures M1 and M2 containing leu-enkephalin obtained by a synthesis of peptides on a solid phase according to an Fmoc strategy. For each of these feeds, a similar model was developed according to the method presented below.

In order to determine a model, the retention times of the peaks and their dispersion have to be calculated.

Figure 7:
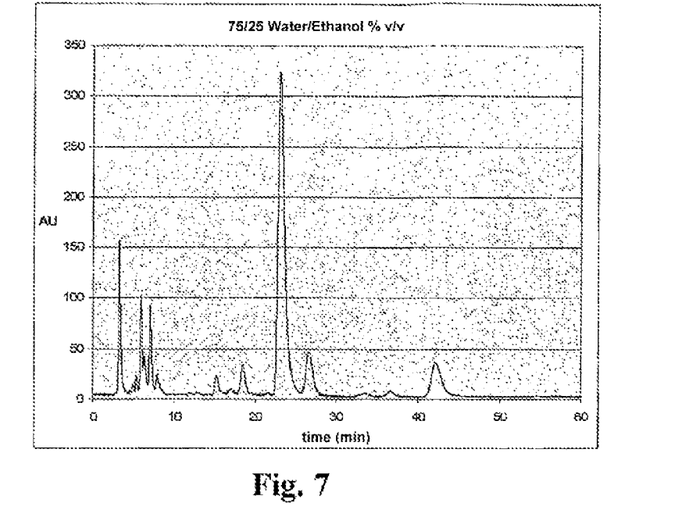
Figure 8:
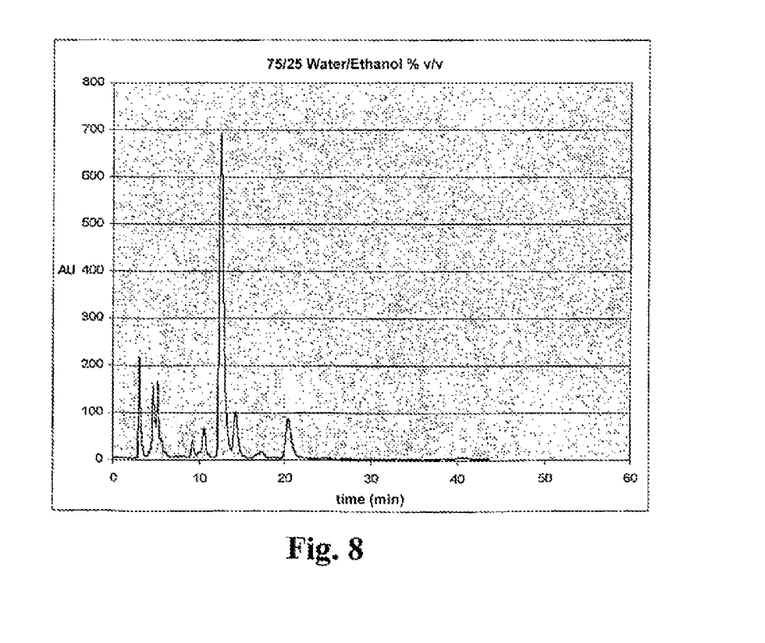
Figure 9:
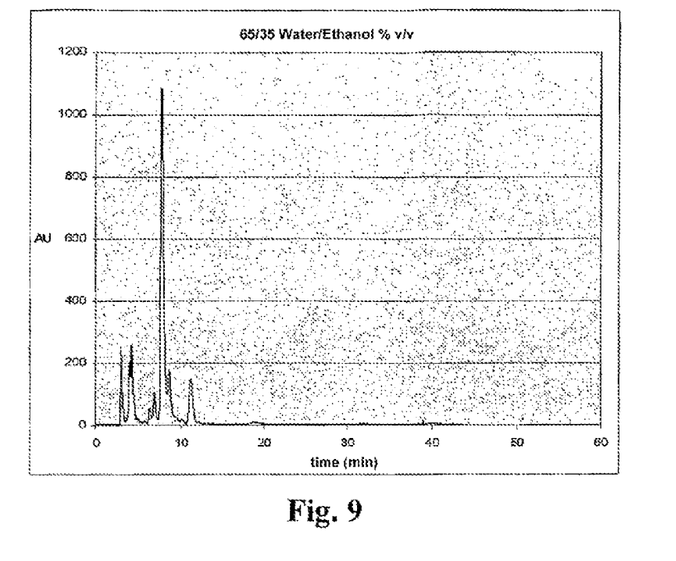

The retention times of the peaks are reproduced from an adsorption equilibrium law, the latter is the same as the one used in the previous examples. The parameters of the equilibrium law were calculated from experimental data. FIGS. 7, 8 and 9 show the chromatograms (UV, $\lambda=220$ nm) obtained with the mixture M1 by taking as a buffer for eluting the mixture, water/ethanol at different compositions (75/25, 70/30 and 65/35, respectively) on a column with a length of 15 cm and a diameter of 0.46 cm (stationary phase Kromasil C18-5 µm). The elution flow rate is 0.5 mL/min. The retention times of leu-enkephalin which were obtained, are 23.0 min, 12.4 min and 7.8 min, respectively. The obtained retention times allowed the parameters of the equilibrium laws to be inferred.

Figure 10:
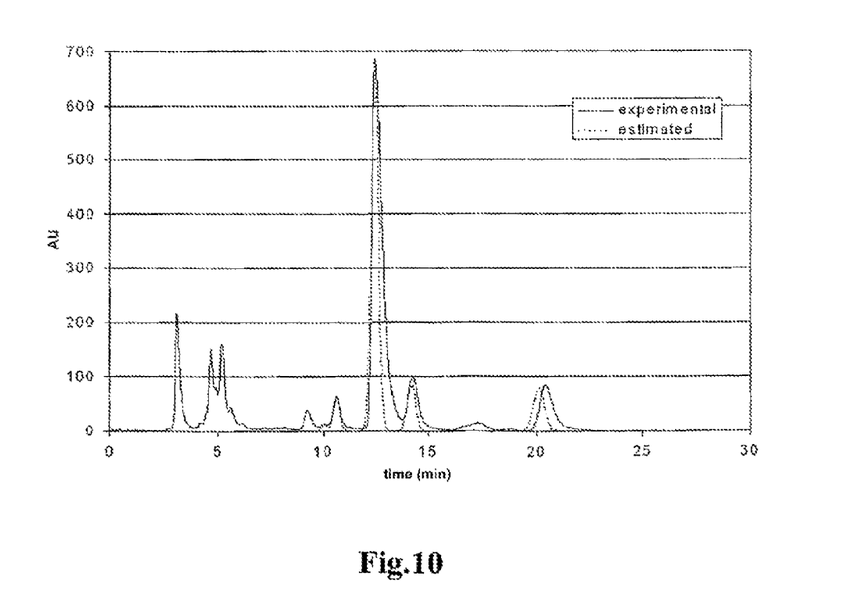
Figure 11:
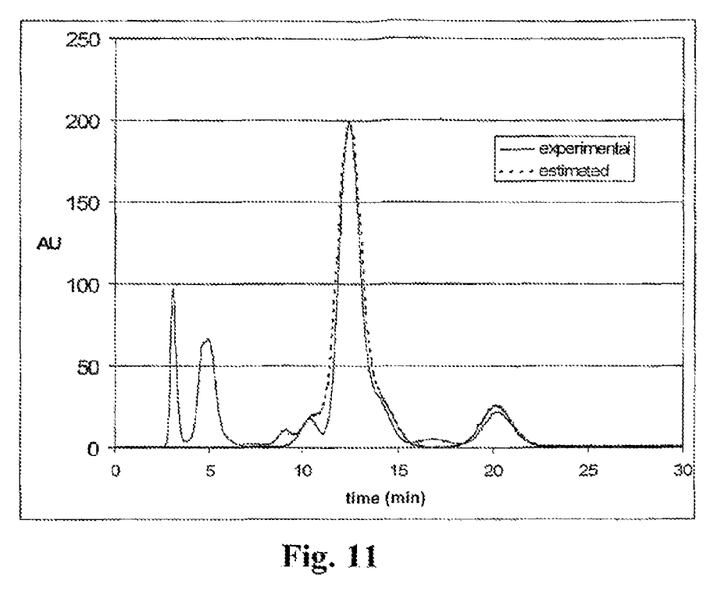

The parameters with which the dispersion of the peaks may be calculated were inferred from the dispersions measured on the chromatograms of FIGS. 10 and 11, with particle diameters of 5 and 25 µm respectively. The dispersion law used is a simplified Van Deemter law:

$$HETP = A \cdot d_p + Bu$$

with HETP: height of the theoretical plateau (cm)
u: linear velocity of the fluid (cm/s)
$d_p$: particle diameter (cm)
A, B: coefficients (A=7.8, B=0.588 s, B being dependent on the square of the particle diameter, this value being given for $d_p=20$ µm).

The leu-enkephalin content of the mixtures M1 and M2 is of 51 and 92% (surface under the chromatogram UV, $\lambda=220$ nm) respectively. With this model it was possible to reproduce in a representative way the behaviors of the leu-enkephalin peak as well as of the closest impurities. FIGS. 10 and 11 show the chromatogram obtained by the use of this model (dotted line), as well as the chromatogram obtained experimentally (solid line). This model may therefore be used for carrying out calculations for representative methods.

Figure 13:
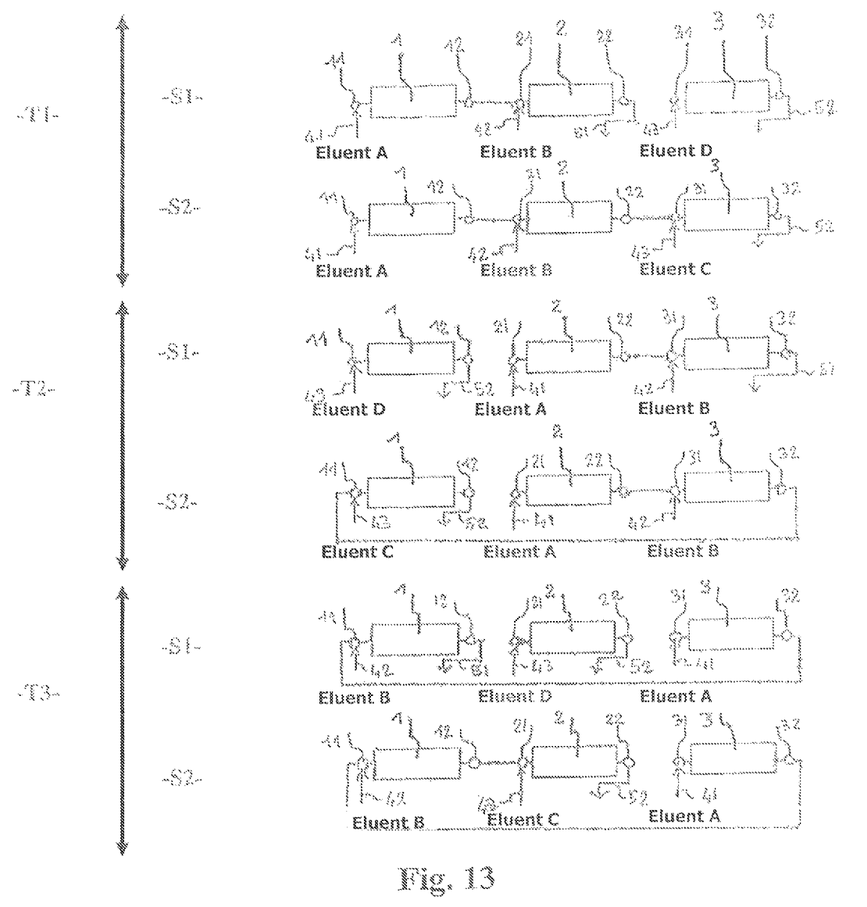

The adjustment to be applied to the mixture M1 according to the method presented in FIG. 13 is described below.

Figure 12:
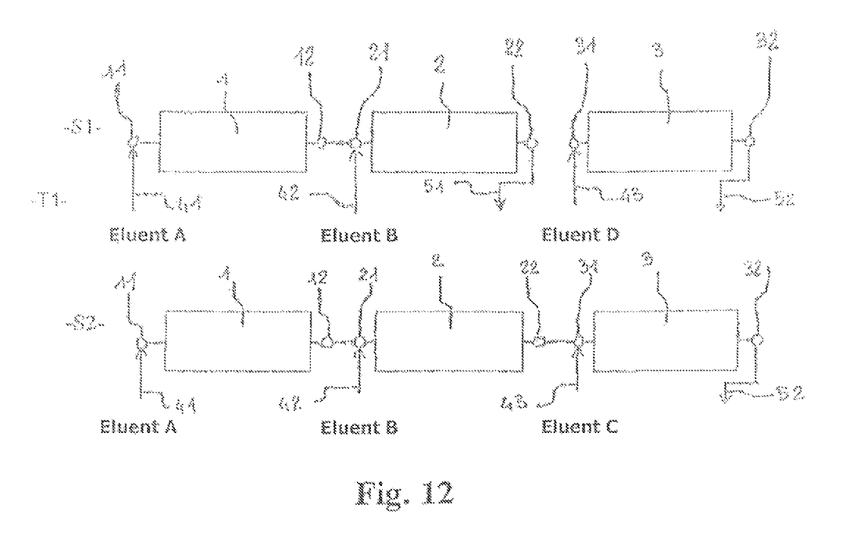
FIGS. 12 to 15, an exemplary operation of the method.

A complete cycle (9.15 min) consists of three periods T1, T2 and T3. A period is defined by two sequences S1 and S2 of respective durations 0.775 and 2.275 min. FIG. 12 schematizes the inlet and outlet lines during the first period T1. The duration of the periods T1, T2 and T3 is 3.05 min. The periods T2 and T3 are inferred from the first period T1 by switching the positions of the inlet and outlet lines of one or of two columns respectively (cf. FIG. 13).

The period T1 includes two sequences S1 and S2. The first sequence S1 includes the injection of three eluents A, B and D through the injection points 41, 42 and 43 in columns 1, 2 and 3 respectively, at the points 11, 21 and 31. Outlets 51 and 52 are connected to the outlets 22 and 32 of columns 2 and 3 respectively. The second sequence S2 includes the injection of three eluents A, B and C through the injection points 41, 42 and 43 in the columns 1, 2 and 3 respectively, at the points 11, 21 and 31. An outlet 52 is connected to the outlet 32 of column 3. The outlet of column 2 is connected to the inlet of column 3 during this second sequence.

At the end of a period T1, the injection points 41, 42, 43 of the eluents are displaced. The method passes to the period T2. The period T2 also includes two sequences S1 and S2. The points for injecting the eluents are displaced so that the eluents A, B and D are injected in columns 2, 3 and 1 respectively (injection points 41, 42 and 43) and the outlets 51 and 52 are connected to the outlets 32 and 12 of columns 3 and 1 during the sequence S1 and the eluents A, B and C are injected into columns 2, 3 and 1 respectively (injection points 41, 42 and 43) and the outlet 52 is connected to the outlet 12 of column 1 during the sequence S2. The outlet of column 3 is connected to the inlet of column 1 during this second sequence S2.

At the end of the period T2, the injection points 41, 42, 43 of the eluents are displaced. The method passes to the period T3. The period T3 also includes two sequences S1 and S2. The points for injecting the eluents are displaced so that the eluents A, B and D are injected into columns 3, 1 and 2 respectively (injection points 41, 42 and 43) and the outlets 51 and 52 are connected to the outlets 12 and 22 of columns 1 and 2 during the sequence S1 and the eluents A, B and C are injected into columns 3, 1 and 2 respectively (injection points 41, 42 and 43) and the outlet 52 is connected to the outlet 22 of column 2 during the sequence S2. The outlet of column 1 is connected to the inlet of column 2 during this second sequence S2.

The lines of eluents A, B, C and D are characterized by the following compositions and flow rates:

line A: 5 mL/min, 33-33.5% EtOH v/v during S1, 33.5-35% EtOH v/v during S2.
line B: 0.5 mL/min, 20% EtOH v/v
line C: 0.5 mL/min, 20% EtOH v/v
line D: 6 mL/min, 50% EtOH v/v A sequence S0 (illustrated in FIG. 14) for injecting the mixture to be separated and for drawing off the product of interest occurs once per cycle, at the beginning of the period T3.

Figure 14:
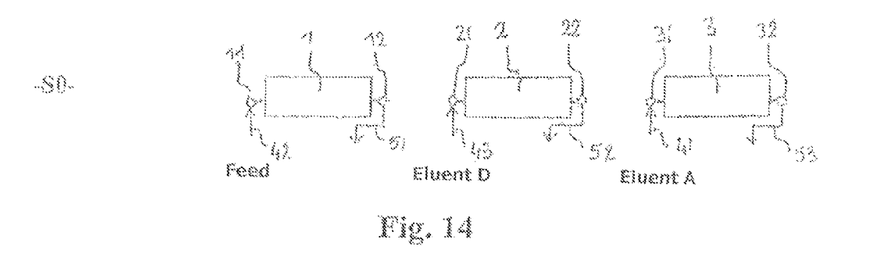

At the beginning of the third period T3 (at t=6.10 min), collecting the product of interest and injecting the mixture to be treated occur simultaneously for 0.5 min. The collection occurs at the outlet 32 of column 3 through the outlet 53 and the injection at the inlet 11 of column 1 through the injection point 42. The purities and yields thereby obtained are then greater than 99%.

The adjustment to be applied to the mixture M2 according to the method of FIG. 13 is described below.

A period is also defined by two sequences S1 and S2 (cf. FIGS. 12 and 13) of respective durations 0.72 and 3.5 min. The duration of the period is 4.22 min.

The lines of eluents A, B, C and D are characterized by the following compositions and flow rates:

line A: 3.5 mL/min, 33.1-33.6% EtOH v/v during S1, 33.6-35% EtOH v/v during S2.
line B: 0.28 mL/min, 20% EtOH v/v
line C: 0.3 mL/min, 20% EtOH v/v
line D: 5 mL/min, 50% EtOH v/v A sequence S0 (illustrated in FIG. 15) for injecting the mixture to be separated and for drawing-off the product of interest occurs only once per cycle, at the beginning of the period T2.

Figure 15:
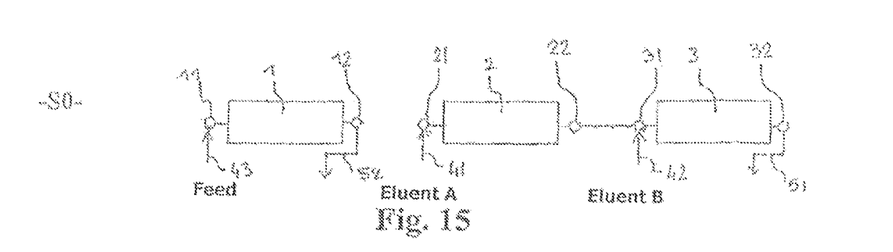

During the second period T2 (between t=7.6 min and t=8.1 min), collecting the product of interest and injecting the mixture to be treated occur simultaneously for 0.5 min. The collection occurs at the outlet 32 of column 3 through the outlet 51 and the injection at the inlet 11 of column 1 through the injection point 43. The thereby obtained purities and yields are then greater than 99%.

The previous examples show that the method adapts to different profiles of raw feeds to be purified. The impurity profile of the mixture M2 has an impurity closer to the product of interest which explains slight differences in adjustments.

The invention claimed is:

1. A method for separating fractions of a mixture to be separated comprising the steps of
    providing a device comprising at least two chromatography columns mounted in series,
    discontinuously injecting a mixture to be separated, in a first single point of the device,
    discontinuously drawing off the fraction enriched in the product of interest, in a second single point of the device, and
    injecting eluents in a plurality of points of each column and displacing the plurality of points for injecting eluents, the eluents having a different eluting power.

2. The method according to claim 1, wherein the injection of the mixture to be separated is cyclic.

3. The method according to claim 1, wherein the drawing-off of the enriched fraction is cyclic.

4. The method according to claim 3, wherein the displacement of the injection points of the eluents is periodic.

5. The method according to claim 1, wherein the eluents are injected continuously or discontinuously.

6. The method according to claim 1, wherein at least one eluent is injected discontinuously.

7. The method according to claim 1, wherein the composition of each eluent is constant.

8. The method according to claim 1, wherein the composition of at least one eluent, independently of each other, is variable.

9. The method according to claim 1, wherein at least one eluent is displaced asynchronously.

10. The method according to claim 1, wherein at least two columns separate the first single point from the second single point, according to the direction of flow of the mobile phase.

11. The method according to claim 1, wherein all the columns of the system separate the first single point from the second single point, according to the direction of flow of the mobile phase.

12. The method according to claim 1, wherein the mixture to be separated is injected by means of units selected from the group comprising an injection loop, and injection pump, a pressurized container.

13. The method according to claim 1, wherein the mixture to be separated is circulated in an additional chromatography column prior to injection into the device.

14. The method according to claim 1, wherein the additional chromatography column is inserted between the mixture injection unit and the unique point for injecting the mixture into the device or is between two columns of the device.

15. A method for separating fractions of a mixture to be separated comprising the steps of:
    providing a device comprising at least two chromatography columns mounted in series,
    discontinuously injecting a mixture to be separated, in a first single point of the device,
    discontinuously drawing off the fraction enriched in the product of interest, in a second single point of the device, and
    injecting eluents in a plurality of points of each column and displacing the plurality of points for injecting eluents, the eluents having a different eluting power; wherein the mixture is a mixture of synthetic molecules, natural extracts, proteins obtained by fermentation, proteins obtained by synthesis or hemi-synthesis, immunoglobulins, monoclonal antibodies, peptides obtained by fermentation, or peptides obtained by synthesis or hemi-synthesis.

16. The method according to claim 1, wherein the method is a non-batch method.

* * * * *